US006938862B2

(12) United States Patent
Orona

(10) Patent No.: US 6,938,862 B2
(45) Date of Patent: Sep. 6, 2005

(54) PORTABLE ELBOW SUPPORT

(76) Inventor: Solomon J. Orona, 31962 Via Montura, San Juan Capistrano, CA (US) 92675-3363

( * ) Notice: Subject to any disclaimer, the term of this patent is extended or adjusted under 35 U.S.C. 154(b) by 0 days.

(21) Appl. No.: 10/376,646

(22) Filed: Feb. 26, 2003

(65) Prior Publication Data

US 2004/0164211 A1 Aug. 26, 2004

(51) Int. Cl.[7] ............................. B68G 5/00; B60J 9/00
(52) U.S. Cl. ................. 248/118; 248/118.1; 296/153
(58) Field of Search ................. 248/214, 118, 248/118.1, 118.5, 229.16, 229.26, 227.4, 225.21, 231.81, 304, 217.3, 216.1, 289.11; 296/153

(56) References Cited

U.S. PATENT DOCUMENTS

| 1,426,787 | A | * | 8/1922 | Spencer | 248/214 |
|---|---|---|---|---|---|
| 1,650,385 | A | * | 11/1927 | Payton | 296/153 |
| D76,952 | S | * | 11/1928 | Payton | D12/421 |
| 1,691,613 | A | * | 11/1928 | Roach et al. | 297/411.21 |
| 1,695,549 | A | * | 12/1928 | Hausler | 248/118 |
| 1,715,862 | A | * | 6/1929 | Payton | 297/411.22 |
| 1,742,447 | A | * | 1/1930 | McKeag | 296/153 |
| 1,873,414 | A | * | 8/1932 | Jarvis | 297/411.22 |
| 1,890,358 | A | * | 12/1932 | Barcalo | 5/640 |
| 2,584,732 | A | * | 2/1952 | Okun | 297/411.25 |
| 2,916,839 | A | * | 12/1959 | Wheaton | 248/216.1 |
| 3,068,048 | A | * | 12/1962 | Mahon et al. | 297/188.15 |
| 3,603,637 | A | * | 9/1971 | DePinto | 296/153 |
| D265,729 | S | * | 8/1982 | Rexroat | D12/421 |
| 4,511,072 | A | | 4/1985 | Owens | |
| 4,592,584 | A | * | 6/1986 | White, Jr. | 296/153 |
| D284,436 | S | * | 7/1986 | Hodges | D6/601 |
| 4,810,026 | A | * | 3/1989 | Doane | 296/153 |
| 4,890,878 | A | * | 1/1990 | Harary et al. | 296/153 |
| 4,982,921 | A | * | 1/1991 | Sanders | 248/118 |
| 5,074,501 | A | * | 12/1991 | Holtta | 248/118.3 |
| 5,281,001 | A | * | 1/1994 | Bergsten et al. | 297/411.24 |
| 5,320,401 | A | * | 6/1994 | Ott | 296/153 |
| 5,370,346 | A | * | 12/1994 | Long | 248/118.5 |
| 5,385,322 | A | * | 1/1995 | Kim et al. | 248/118 |
| 5,527,084 | A | | 6/1996 | Scherf | |
| D419,130 | S | * | 1/2000 | Dyment | D12/421 |
| 6,042,064 | A | * | 3/2000 | Hong | 248/118.5 |
| 6,467,737 | B1 | * | 10/2002 | Dorantes | 248/118 |

FOREIGN PATENT DOCUMENTS

JP          10211794 A    *  8/1998

OTHER PUBLICATIONS

Possible prior art, "Road Rest," Internet Website, Herringtoncatalog.com, Copyright 2000, Herrington, 3 Symmes Drive, Londonderry, N.H. 03053,printed out on Apr. 23, 2003.

Possible prior art, "Window Armrest," Internet Website mmmiata.com, Copyright 1999–2001, MM Marketing Online Store, MM Marketing, 222 Franklin Street—Fayetteville, NC 28301, printed out on Feb. 26, 2003.

* cited by examiner

*Primary Examiner*—Anita M. King
(74) *Attorney, Agent, or Firm*—Christie, Parker & Hale, LLP

(57) ABSTRACT

A portable elbow support having a hanger portion, a horizontal stabilizing portion, a vertical stabilizing portion, a support platform, and an elbow receiving portion that is coupled to the support platform.

10 Claims, 7 Drawing Sheets

PORTABLE ELBOW SUPPORT

BACKGROUND OF THE INVENTION

This invention is related to portable ergonomic support devices, and more specifically, to a portable elbow support.

When traveling, whether by automobile, plane, train, bus or other means, the seating provided does not always allow the traveler to be as comfortable as he or she would like. Further, certain travelers may prefer to sleep during such travel, another activity not always easily achieved by the accommodations provided. Many travelers have become accustomed to bringing along devices to make them more comfortable, such as specifically designed headrests or pillows. However, some travelers may prefer to sleep in a position not amenable to the use of a pillow or headrest.

The inventor has discovered that particular individuals, when traveling as a passenger in an automobile, prefer to sleep leaning forward in their seat, resting their elbow and arm along the door or arm rest, and resting their head on their hand. Such a "forward sleeping" position is generally not easily accommodated by the design of most vehicles. First, many vehicles completely lack arm rests on which the traveler could rest its elbow or arm. In those vehicles that do include arm rests, the arm rests are generally not in a position to be utilized as an elbow support for such forward sleeping. Even where aftermarket armrests may be available, they are generally designed strictly as a horizontal arm support at the top of the door, for the comfort of the driver, and are not designed to accommodate forward sleeping.

Thus there exists the need for a portable elbow support which may be used in a variety of vehicles and may be attached to a variety of structures, to provide a comfortable support for travelers wishing to sleep in a forward position.

SUMMARY OF THE INVENTION

The present invention is a portable elbow support adapted for attachment to a variety of structures.

One aspect of an embodiment of this invention is that the elbow support is portable, and may be attached to a wide variety of structures.

Another aspect of an embodiment of the invention is that the position of the elbow support may be adjusted, to accommodate both a variety of travelers, and a variety of vehicles.

Another aspect of an embodiment of the invention is that the elbow support has a universal attachment mechanism, which enables it to be attached to a variety of different vehicles.

Another aspect of an embodiment of the invention is that it is portable, and may easily be attached, removed, adjusted or repositioned.

Another aspect of an embodiment of the invention is that it includes stabilizing portions to maintain the proper position of the support, and prevent unwanted tilting, wobbling or rotating.

Many of the attendant features of this invention will be more readily appreciated as the same becomes better understood by reference to the following detailed description and considered in connection with the accompanying drawings.

DETAILED DESCRIPTION OF THE INVENTION

Figure 1:
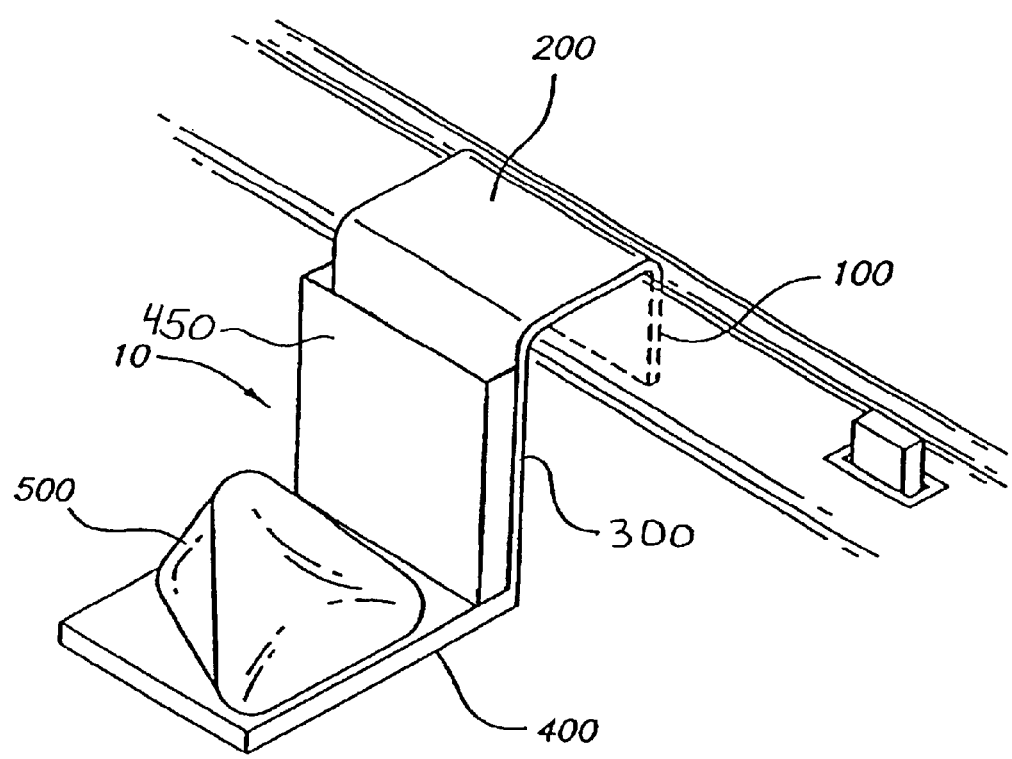
FIG. 1 is a perspective view of an embodiment of the present invention.
Figure 7:
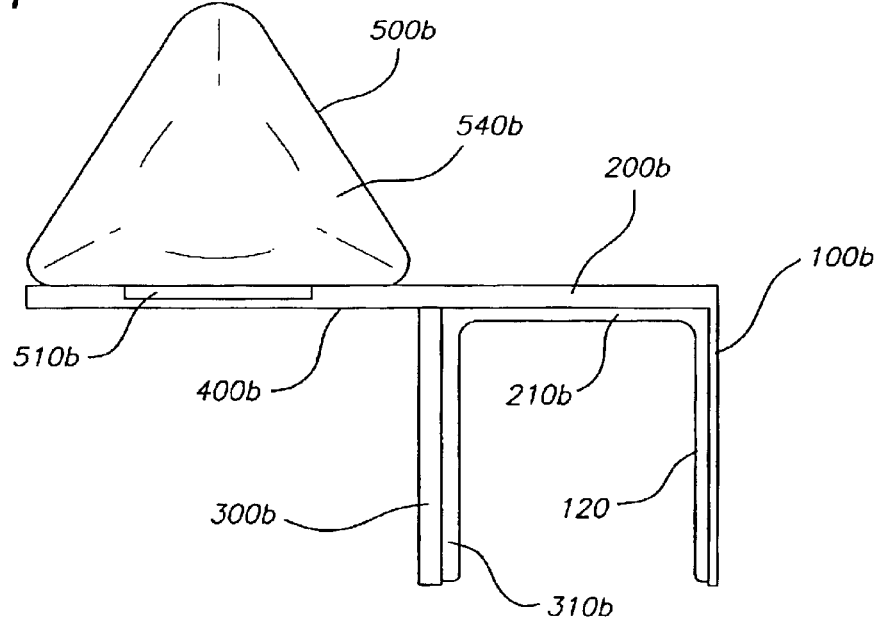
FIG. 7 is a section view of an embodiment of the present invention.

As illustrated in FIG. 1, in one embodiment of the present invention, the support includes several components. First, the support includes a means for attaching the support to a structure. FIG. 1 illustrates an embodiment utilizing a flexible hanger 100 attaching the support 10 to a vehicle door. In one embodiment, the hanger 100 is constructed from rubber. However, in other embodiments, the hanger is constructed from plastic, nylon, polymer, fabric or other flexible material. In another embodiment, as illustrated in FIG. 7, the hanger 100b is rigid. It will be appreciated by those skilled in the art that in addition to such hangers, in other embodiments the attachment means include clamps, hooks, wires, screws, rivets, adhesives, brackets, pillars, columns, bases, and other attachment methods known in the art. Further, the support may be removably attached, to allow repositioning and/or removal, and subsequent attachment to another support, or it may be fixedly attached to a structure.

In addition, it may be attached in a way that utilizes some permanent components and some removable components. For example, in one embodiment, mating hook and loop fastener portions (such as VELCRO by Velcro Industries B.V. Corporation Netherlands, Castorweg 22 24 Curacao, Netherland Antilles) are adhesively attached to the support and to the structure. The support may then be attached to the structure by bringing together the mating portions, or may be removed by taking apart the mating portions. It will be appreciated by those skilled in the art that the type of attachment means chosen for the particular embodiment may be selected to best complement the type of structure to which the support is intended to be attached.

As further illustrated in FIG. 1, in one embodiment of the present invention, the support 10 further includes a horizontal stabilizing portion 200, a vertical stabilizing portion 300, a support platform 400, and an elbow receiving portion 500. In the embodiment shown in FIG. 1, the elbow receiving portion 500 has an open tetrahedral shape, forming a cup-type shape to receive the user's elbow. It will be appreciated by those skilled in the art that the elbow receiving portion may be constructed in a variety of shapes, preferably having a base portion, and at least one wall portion adjacent to the base portion and extending upwardly therefrom, together defining a cavity to better receive the elbow, as shown in FIGS. 1–7 and 10–12. Please note that in order to maintain continuity in the description of the various embodiments, similar features of the various embodiments have been described with similar reference numerals. In one embodiment, the horizontal stabilizing portion 200 is constructed from plastic. In other embodiments, the horizontal stabilizing portion 200 is constructed of metal, nylon, polymer, laminates, reinforced fiber, rubber, or a composite material. In one embodiment, as shown in FIG. 3, the horizontal stabilizing portion 200 includes a lower surface portion 210, preferably constructed from a resilient material such as foam. It will be appreciated by those skilled in the art that while this embodiment uses a resilient foam, in other embodiments this lower surface 210 is constructed from rubber, fabric, felt, nylon, gel, polymer, or plastic. The lower surface provides a cushioning support to the horizontal stabilizing portion 200, which acts to dampen and absorb shocks and vibrations, prevents damage to the portion of the support with which it is in contact, and to at least partially conform to the shape of the support with which it is in contact with to provide increased stability. It will be appreciated by those skilled in the art that other materials which provide such features may also be used to construct the lower surface 210. In another embodiment, shown in FIG. 2, the horizontal stabilizing portion 200 includes extensions 220. Although triangular extensions are shown, it will be appreciated that the extensions may also be square, rectangular, round, or any other shape that will provide additional stability. Where additional stability is not necessary, such extensions 220 may be omitted.

As shown in FIG. 3, in one embodiment, the vertical stabilizing portion 300 is constructed from plastic. In other embodiments, the vertical stabilizing portion 300 is constructed of metal, nylon, polymer, laminates, reinforced fiber, rubber, or a composite material. In another embodiment, the vertical stabilizing portion is adapted to match the contour of the structure to which it is attached, such as a car door. In one such embodiment, the vertical stabilizing portion uses a flexible, louvered design (not shown). In the embodiment shown in FIG. 2, the vertical stabilizing portion 300 also includes extensions 320 for added stability. In other embodiments, the extensions are round, square, rectangular or any other shape that provides additional stability. In another embodiment, where additional stability is not needed, the extensions 320 are omitted.

In the embodiment shown in FIG. 3, the vertical stabilizing portion 300 includes an interior surface portion 310, preferably constructed from a resilient material such as foam. In other embodiments, the interior surface 310 is constructed from rubber, fabric, felt, nylon, gel, polymer, or plastic. The lower surface provides a cushioning support to the vertical stabilizing portion 300, which acts to dampen and absorb shocks and vibrations, prevents damage to the portion of the support with which it is in contact, and to at least partially conform to the shape of the support with which it is in contact with to provide increased stability. It will be appreciated by those skilled in the art that other materials which provide such features may also be used to construct the interior surface 310.

Figure 2:
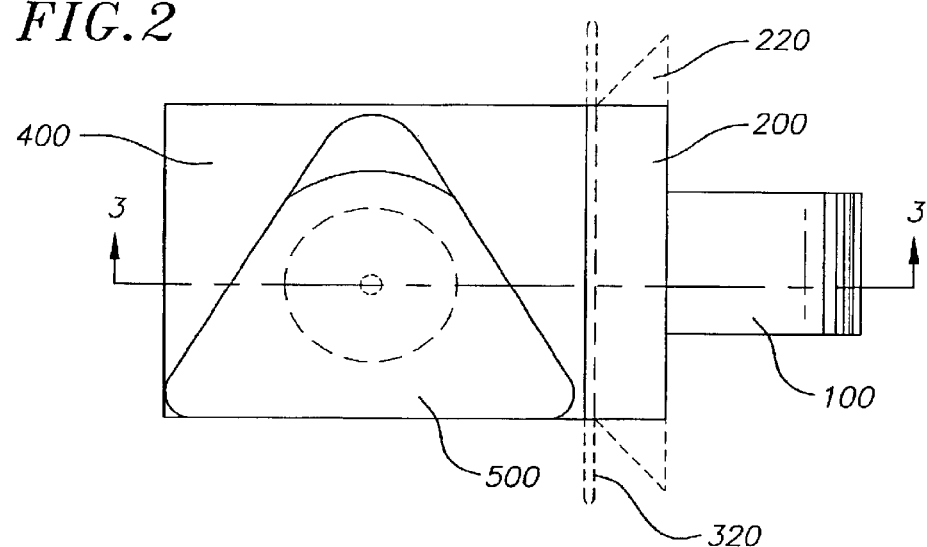
FIG. 2 is a top view of an embodiment of the present invention.
Figure 3:
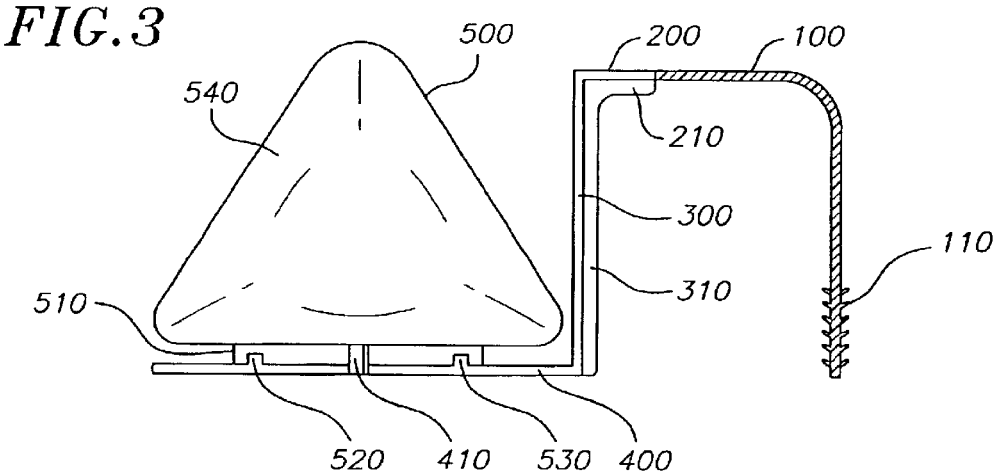
FIG. 3 is a section view of an embodiment of the present invention.
Figure 4:
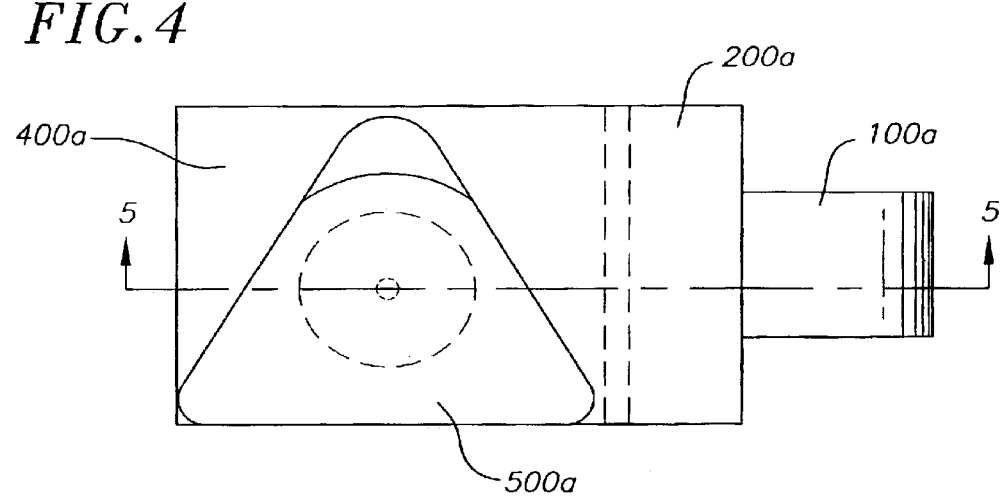
FIG. 4 is a top view of an embodiment of the present invention.

In the embodiments shown in FIGS. 1–3, the flexible hanger 100 is lowered down the window frame between the car door and the window glass. In one embodiment, the length of the flexible hanger 100 is a predetermined length based on the specific type of vehicle in which it will be used. In another embodiment, the length of the flexible hanger 100 is a predetermined substantially universal length to accommodate use in a variety of vehicle types. The flexible hanger 100 is lowered until the lower surface 210 of the horizontal stabilizing portion 200 of the support 10 is adjacent the top of the door structure, and until the interior surface 310 of the vertical stabilizing portion 300 is adjacent the side of the door structure. In this embodiment, the flexible hanger 100 includes retaining means 110 which frictionally engage the window surface to retain the hanger 100 and the entire support 10 in place. It will be appreciated that the width of the hanger 100 and the number of retaining means 110 may be varied depending on the specific application. In this embodiment, the retaining means are rubber fins or vanes which engage the window surface. In other embodiments, the retaining means 110 of the hanger are fins of nylon, plastic, polymer or fabric. In yet other embodiments, the retaining means are adhesives, suction cups, or foam.

Figure 10:
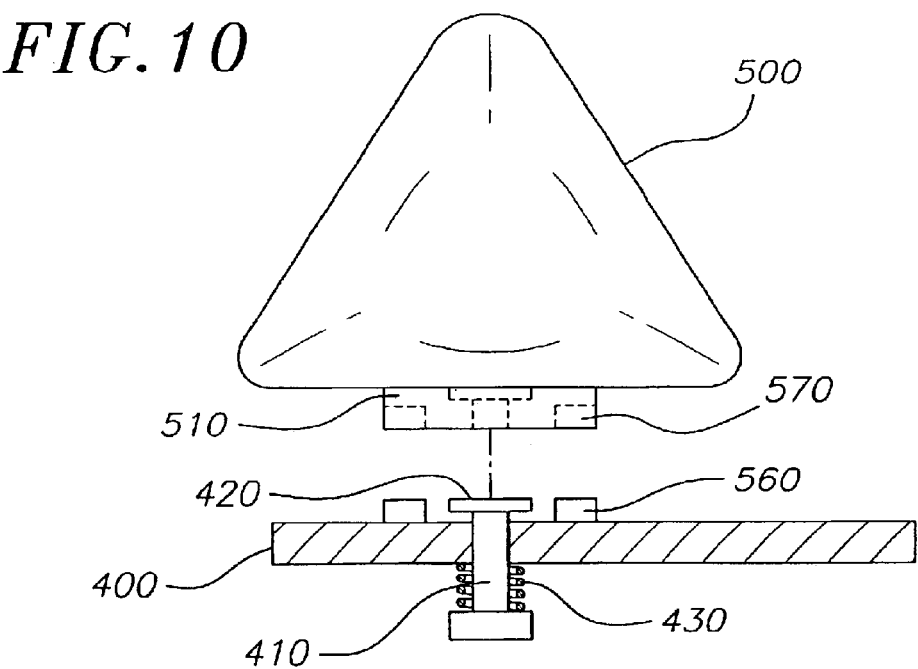
FIG. 10 is a side view of the support platform of an embodiment of the present invention.

The embodiment illustrated in FIG. 3 also includes a support platform 400, constructed from plastic. In other embodiments, the support platform 400 is constructed of metal, nylon, polymer, laminates, reinforced fiber, rubber, or a composite material. The support platform 400 supports the elbow receiving portion 500. In the embodiment shown in FIG. 3, the elbow receiving portion 500 is rotatably coupled to the support platform through connector 410 and plate 510. In this embodiment, the plate 510 is attached to the elbow receiving portion 500. The plate 510 receives the connector 410, which in this embodiment is a spindle, allowing the elbow receiving portion 500 to rotate. In one embodiment, such as shown in FIG. 10, the spindle further includes a locking mechanism 420, which locks the spindle to the plate 510 and the elbow receiving portion 500. In this embodiment, the elbow receiving portion is biased downward by a spring 430. In another embodiment shown in FIG. 11, the elbow receiving portion is biased downward only by gravity.

Figure 8:
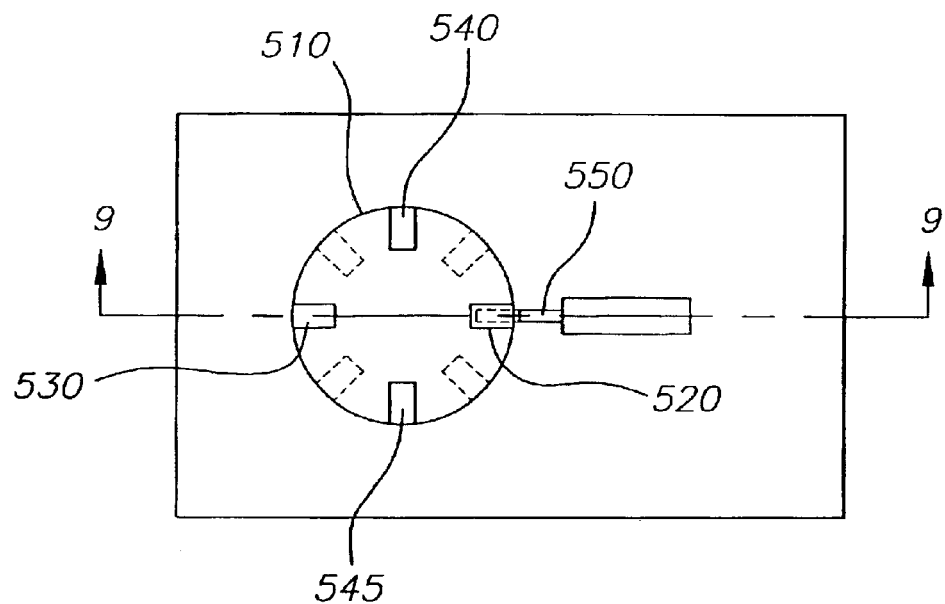
FIG. 8 is a top view of the support platform of an embodiment of the present invention.
Figure 9:
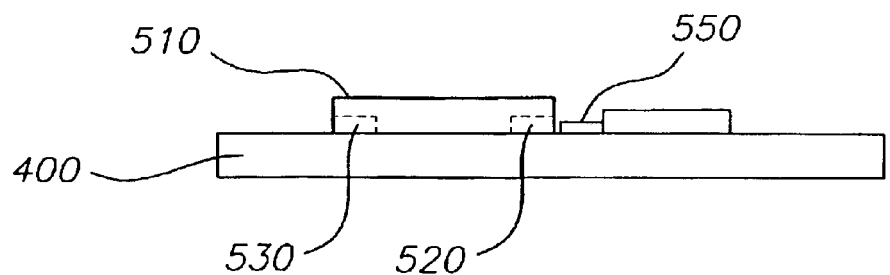
FIG. 9 is a section view of the support platform of an embodiment of the present invention.

In the embodiment shown in FIG. 3, the plate 510 includes notches 520, 530 adapted to receive mating tabs or protrusions from the support platform, thereby locking the plate and receiving portion in place and preventing rotation. In the embodiment shown, the elbow receiving portion may be locked in place in either of two positions, so that the support may be used for passengers on the right or left side of a vehicle. As shown in FIGS. 8 and 9, in another embodiment the tab 550 slides horizontally on the support platform 400, from a non-engaged position to an engaged position, thereby locking the plate in position. In another embodiment, the tabs are spring biased into the engaged position. Notches 520, 530 on the plate 510 are provided to receive the tab 550 at desired positions. Additional notches 540, 545 may be provided to fix the plate in additional positions. It will be appreciated that more or fewer notches may be used, depending on the particular application.

Figure 11:
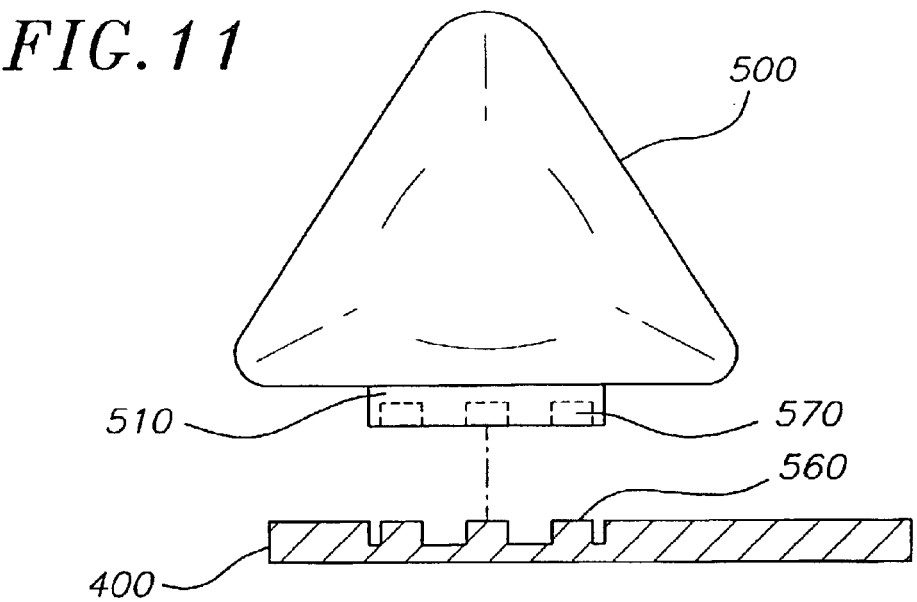
FIG. 11 is a side view of the support platform of an embodiment of the present invention.

In another embodiment, as shown in FIGS. 10 and 11, the tabs 560 are fixed and oriented vertically, substantially perpendicular to the support platform. Mating notches 570 on the plate receive the tabs, locking the plate in place. To rotate the plate, it is lifted up to disengage the tabs, rotated to the desired position, then placed back down on the tabs. In one embodiment, four tabs are located on the support platform, and four notches on the plate, located 90 degrees apart. It will be appreciated by those skilled in the art that the number of tabs may be varied, depending on the desired number of positions of the plate. In another embodiment, one or more set screws (not shown) are used to hold the plate in place. In another embodiment, a ratchet mechanism (not shown) allows the plate to rotate between selected positions.

In another embodiment, the elbow receiving portion 500 is fixedly attached to the support platform 500.

In the embodiment shown in FIG. 3, the elbow receiving portion 500 includes a liner 540. In one embodiment, the liner is constructed of a resilient material such as foam to provide a comfortable surface to the user. It will be appreciated by those skilled in the art that other materials, or combinations of material, may also be used for the liner, such a gel, nylon, plastic, fabric, polymers, elastics, rubber or synthetics. In one embodiment, the liner 540 is removably attached to the receiving portion 500, allowing the liner to be easily replaced if worn, or if a different color liner is desired, or the liner may be removed for washing.

Figure 5:
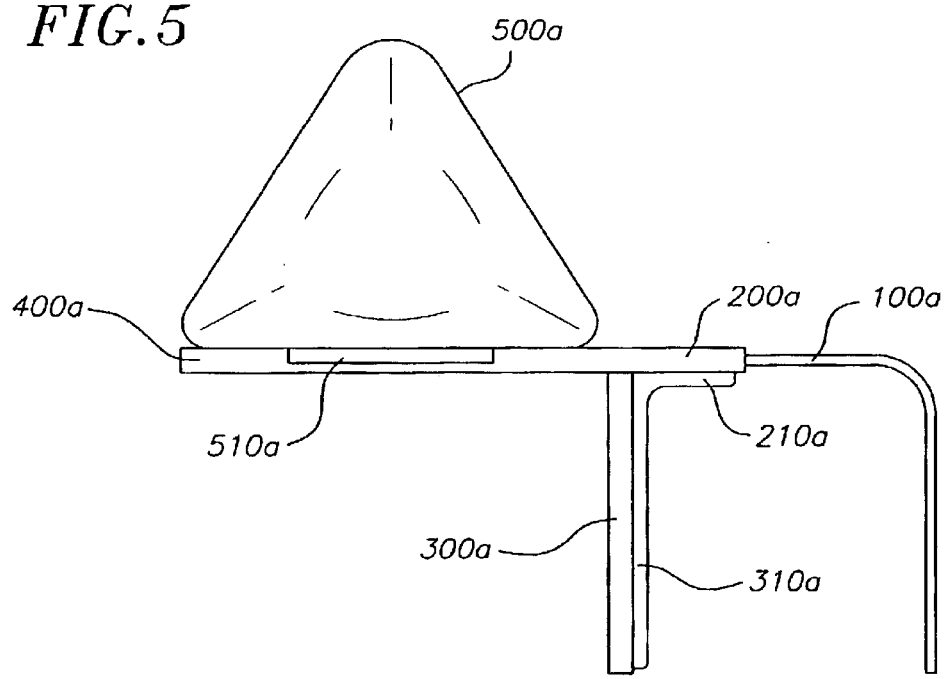
FIG. 5 is a section view of an embodiment of the present invention.
Figure 6:
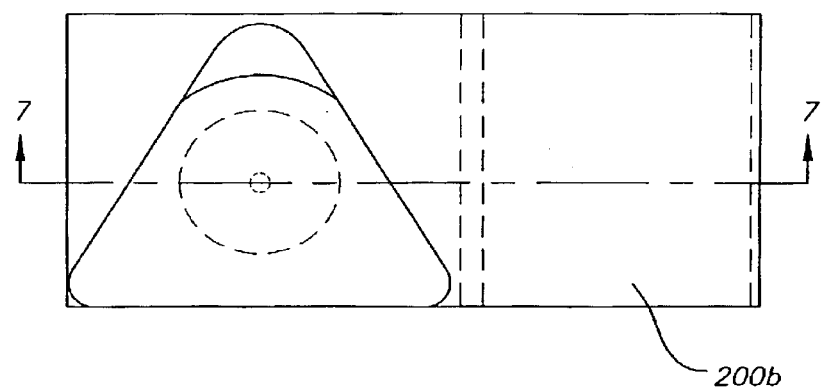
FIG. 6 is a top view of an embodiment of the present invention.
Figure 12:
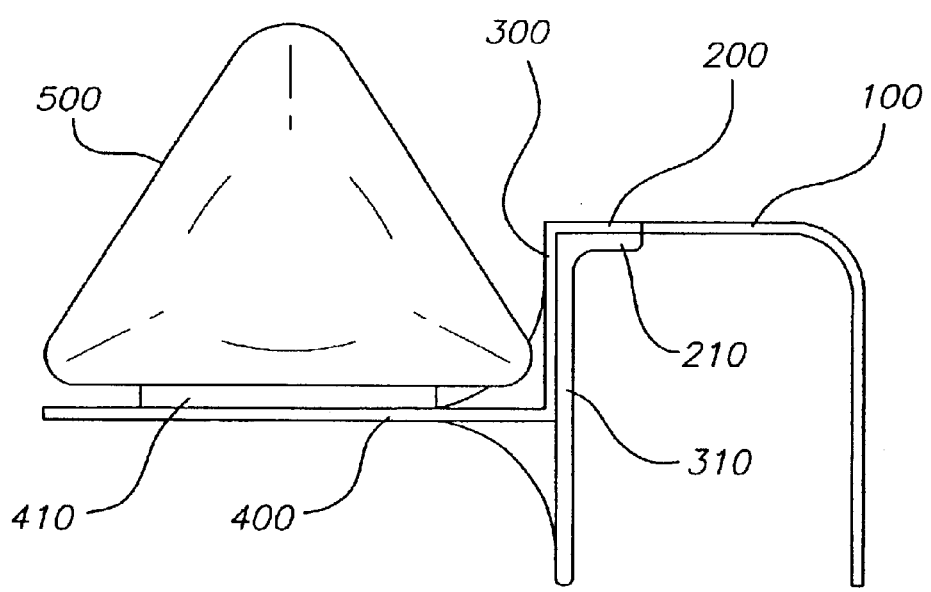
FIG. 12 is a side view of an alternative embodiment of the present invention.

It will be further appreciated that in the present invention, the location of the support platform may be varied while still defining the present invention. For example, FIG. 3 illustrates an embodiment with the support platform located at the base of the vertical stabilizing portion. FIGS. 5 and 7 illustrate an embodiment where the support platform is located at the top of the vertical stabilizing portion. FIG. 12 illustrates yet another embodiment, with the support platform located centrally along the vertical stabilizing portion. It will be appreciated that in the present invention, the support platform may be located anywhere along the length of the vertical stabilizing portion.

FIG. 5 illustrates another embodiment where the hanger 100a is flexible. In this embodiment, the support platform 400a is located at the upper end of the vertical stabilizing portion 300a, adjacent the horizontal stabilizing portion 200a. The horizontal stabilizing portion includes a lower surface 210a. The vertical stabilizing portion includes an interior surface 310a.

In the embodiment shown in FIG. 7, the hanger 100b is rigid rather than flexible. In this embodiment, the hanger further includes an interior surface portion 120, similar to the lower surface portion 210b of the horizontal stabilizing portion 200b, or the interior surface portion 310b of the vertical stabilizing portion 300b.

In another embodiment, the length of the horizontal stabilizing portion is adjustable. It will be appreciated by those skilled in the art that such adjustment may be accomplished in a variety of ways, depending on the particular application. In one embodiment, the horizontal stabilizing portion includes an adjustable telescoping portion. In another embodiment, a ratchet mechanism is used to regulate movement. In either embodiment, a locking feature, such as a release button or set screw, may be used to preclude movement. It will be appreciated that other adjustment mechanisms known in the art may also be used in conformance with the present invention.

In another embodiment as shown in FIG. 1, the support platform supports storage compartments 450 in addition to the elbow receiving portion.

Although the invention has been described in detail with reference to several embodiments, those having ordinary skill in the art will appreciate that various modifications can be made without departing from the scope and spirit of the invention.

Accordingly, the invention is defined with reference to the following claims.

What is claimed is:

1. A portable elbow support comprising:
a hanger portion;
a horizontal stabilizing portion;
a vertical stabilizing portion;
a support platform; and
an elbow receiving portion, having a base portion, and at least one wall portion adjacent to the base portion and extending upwardly therefrom, together defining a cavity, coupled to the support platform;
wherein the elbow receiving portion is rotatably coupled to the support platform.

2. A portable elbow support as in claim 1, further comprising one or more tabs on the support platform.

3. A portable elbow support comprising:
a hanger portion;
a horizontal stabilizing portion;
a vertical stabilizing portion;
a support platform; and
an elbow receiving portion, having a base portion, and at least one wall portion adjacent to the base portion and extending upwardly therefrom, together defining a cavity, coupled to the support platform; and
a plate coupled between the elbow receiving portion and the support platform.

4. A portable elbow support as in claim 3, further comprising one or more notches on the plate.

5. A portable elbow support as in claim 3, further comprising one or more tabs on the support platform adapted to mate with one or more notches on the plate.

6. A portable elbow support as in claim 3, further comprising a spindle coupling the support platform to the receiving portion, through the plate.

7. A portable elbow support as in claim 6, wherein the spindle includes a locking mechanism.

8. A portable elbow support, comprising:
a hanger portion;
a horizontal stabilizing portion;
a vertical stabilizing portion;
a support platform;
an elbow receiving portion, coupled to the support platform;
a plate coupled between the elbow receiving portion and the support platform; and
one or more tabs on the support platform adapted to mate with one or more notches on the plate;
wherein the tabs are slidable horizontally along the support platform.

9. A portable elbow support comprising:
a hanger portion;
a horizontal stabilizing portion;
a vertical stabilizing portion;
a support platform; and
an elbow receiving portion, having a base portion, and at least one wall portion adjacent to the base portion and extending upwardly therefrom, together defining a cavity, coupled to the support platform; and
a storage compartment.

10. A portable elbow support, comprising:
a horizontal support platform;
a vertical portion, coupled to and substantially perpendicular to the horizontal support platform;
a rotatable elbow receiving portion, having a base portion and a plurality of adjacent wall portions extending upwardly from the base portion, thereby defining a cavity, the elbow receiving portion coupled to the horizontal support platform; and
a means for attaching the support to a structure;
wherein the elbow receiving portion has a substantially tetrahedral shape that is open on one face.

* * * * *